(12) United States Patent
Wetzel et al.

(10) Patent No.: US 11,002,669 B2
(45) Date of Patent: May 11, 2021

(54) DEVICE AND METHOD FOR ANALYZING OBJECTS

(71) Applicant: VoxelGrid GmbH, Munich (DE)

(72) Inventors: Karl Christian Wetzel, Munich (DE); Charoula Andreou, Munich (DE)

(73) Assignee: VOXELGRID GMBH, Munich (DE)

(*) Notice: Subject to any disclaimer, the term of this patent is extended or adjusted under 35 U.S.C. 154(b) by 34 days.

(21) Appl. No.: 16/485,130

(22) PCT Filed: Feb. 9, 2018

(86) PCT No.: PCT/EP2018/053352
§ 371 (c)(1),
(2) Date: Aug. 9, 2019

(87) PCT Pub. No.: WO2018/146279
PCT Pub. Date: Aug. 16, 2018

(65) Prior Publication Data
US 2019/0371056 A1 Dec. 5, 2019

(30) Foreign Application Priority Data

Feb. 10, 2017 (EP) ..................... 17000215

(51) Int. Cl.
*G06T 7/62* (2017.01)
*G01N 21/35* (2014.01)
(Continued)

(52) U.S. Cl.
CPC .......... *G01N 21/35* (2013.01); *B64C 39/024* (2013.01); *G01C 15/002* (2013.01); *G01C 21/165* (2013.01); *G01N 21/94* (2013.01); *G01S 17/42* (2013.01); *G01S 17/89* (2013.01); *G01S 19/01* (2013.01); *G05D 1/0246* (2013.01);
(Continued)

(58) Field of Classification Search
CPC ........... G01N 21/35; G06T 7/62; G06T 17/05; B64C 39/024; B64C 2201/123; G01C 15/002; G01C 21/165; G06K 9/00637
See application file for complete search history.

(56) References Cited

U.S. PATENT DOCUMENTS 8,810,599 B1* 8/2014 Tseng ................... G05D 1/0246
345/633
9,495,618 B1* 11/2016 Tabb ........................ G06K 9/66
(Continued)

OTHER PUBLICATIONS

Chmelar, Pavel, et al.; "Projection of Point Cloud for Basic Object Detection"; 56th International Symposium ELMAR-2014, Sep. 10-12, 2014, Zadar Croatia; 4 pp.
(Continued)

*Primary Examiner* — Said Broome
(74) *Attorney, Agent, or Firm* — Womble Bond Dickinson (US) LLP

(57) ABSTRACT

A device and a method for analyzing objects, including buildings, build environments and/or environment areas is proposed. Image data points of an object are gathered and geo-referenced in order to generate object data points. Properties of the object such as material composition, material state or material properties are determined based spectral characteristics evaluation. Three-dimensional object models are generated in accordance with the evaluation of spectral characteristics.

19 Claims, 9 Drawing Sheets

(51) Int. Cl.

| | | |
|---|---|---|
| *B64C 39/02* | (2006.01) | |
| *G01C 15/00* | (2006.01) | |
| *G01C 21/16* | (2006.01) | |
| *G01N 21/94* | (2006.01) | |
| *G01S 17/42* | (2006.01) | |
| *G01S 17/89* | (2020.01) | |
| *G01S 19/01* | (2010.01) | |
| *G05D 1/02* | (2020.01) | |
| *G06K 9/00* | (2006.01) | |
| *G06T 17/05* | (2011.01) | |

(52) U.S. Cl.
CPC ............ *G06K 9/00637* (2013.01); *G06T 7/62* (2017.01); *G06T 17/05* (2013.01); *B64C 2201/123* (2013.01); *G05D 2201/0207* (2013.01)

(56) References Cited

U.S. PATENT DOCUMENTS

| | | | |
|---|---|---|---|
| 2013/0202197 | A1 | 8/2013 | Reeler et al. |
| 2015/0006117 | A1* | 1/2015 | Zhang .................... G06F 30/13 703/1 |

OTHER PUBLICATIONS

European Search Report application No./Patent No. 17000215.8; dated Jul. 7, 2017; 11 pp.
Grinzato, Ermanno; "IR Thermography Applied to the Cultural Heritage Conservation"; 18th World Conference on Nondestructive Testing, 16-20, Durban South Africa; 4 pp.
International Search Report and Written Opinion of the International Searching Authority of PCT/EP2018/053352; completion date Mar. 16, 2018; 17 pp.
Maletzos, Evangelos, et al.; "Automatic Detection of Building Points From Lidar and Dense Image Matching Point Clouds"; ISPRS Annals of the Photogrammetry, Remote Sensing and Spatial Information Sciences, vol. II3/W5, Sep. 28, 2015-Oct. 3, 2015, La Grande Motte, France; 8 pp.
Wang, Miao, et al.; "Extraction of Surface Features from LiDAR Point Clouds Using Incremental Segmentation Strategy"; Journal of Photogrammetry and Remote Sensing vol. 19, No. 1, Nov. 2014; 14pp.
International Preliminary Report on Patentability received for PCT Patent Application No. PCT/EP2018/053352, dated Aug. 22, 2019, 13 pages.
Miao Wang et al: "Incremental segmentation of lidar point clouds with an octree-structured voxel space", The Photogrammetric Record, Mar. 2011 (Mar. 2011), pp. 32-57.

* cited by examiner

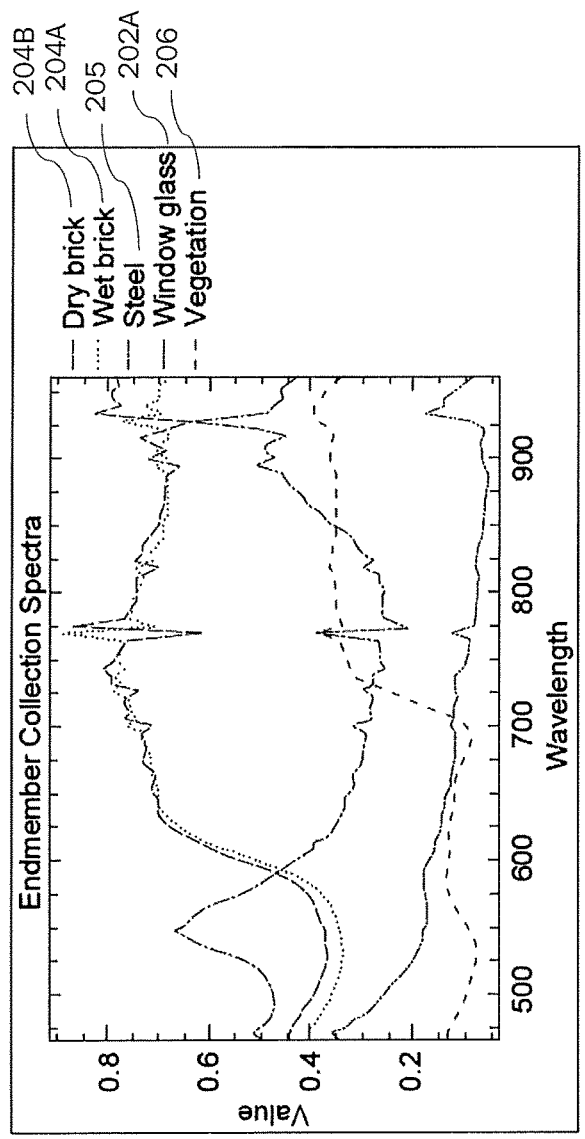
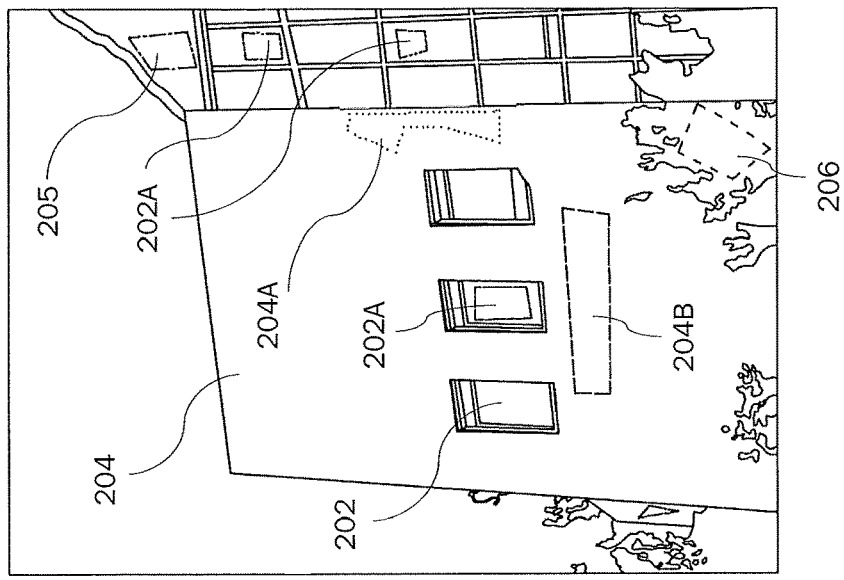
FIG. 5A

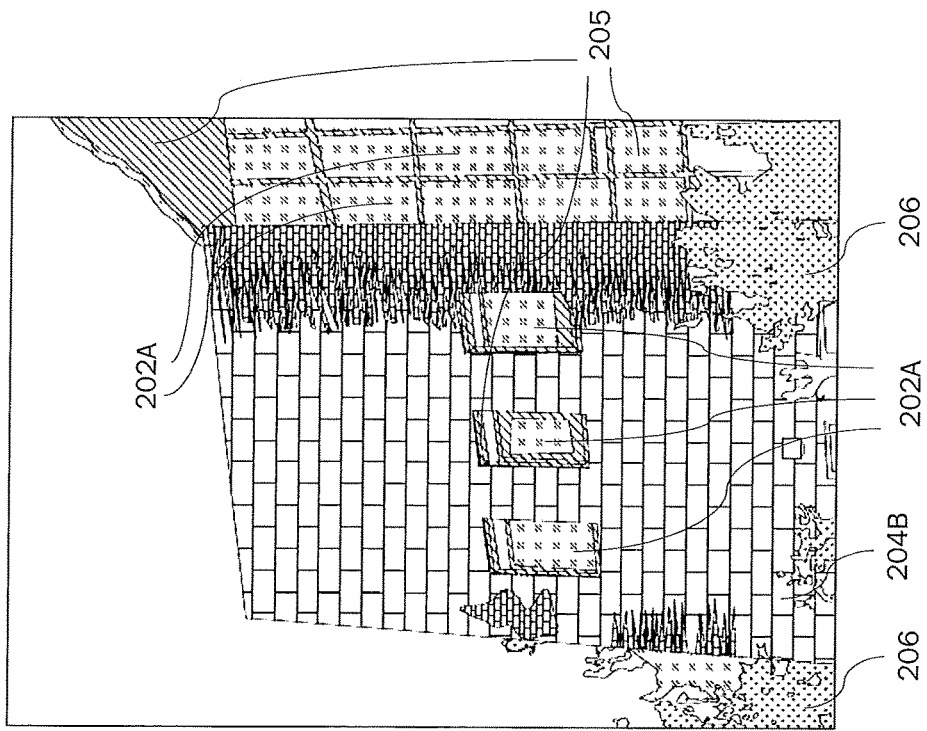
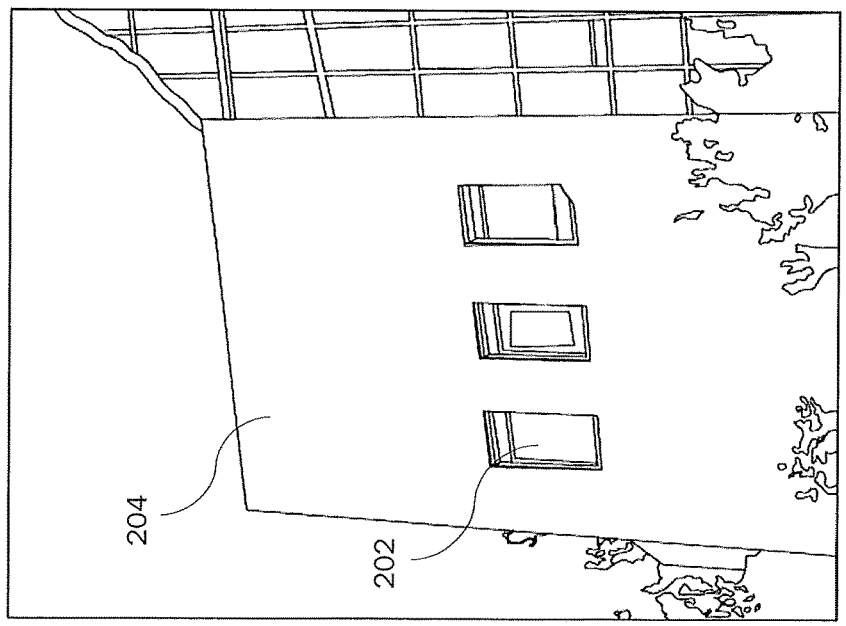
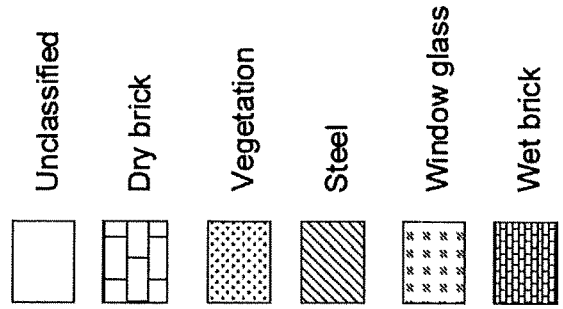
FIG. 5B

DEVICE AND METHOD FOR ANALYZING OBJECTS

CROSS-REFERENCE TO RELATED APPLICATIONS

This application is the U.S. National Stage entry under 35 U.S.C. § 371 of international application PCT/EP2018/053352, filed 9 Feb. 2018, which in turn claims priority to European patent application 17000215.8, filed 10 Feb. 2017.

Field of the Invention

The present document relates to a device and method to obtain the geometric shape and material properties of buildings, build environments and/or environment areas and their respective three-dimensional model generation and representation. Furthermore, material properties such as degradation degrees of surveyed objects like buildings, build environments and/or environment areas can be determined very efficiently and in a fast manner.

BACKGROUND

Web mapping services are capable of featuring maps for a variety of locations such as cities and towns or natural landscapes. In particular, map imagery in one location may comprise a birds eye perspective that directly integrates three-dimensional landscape and terrain features. For example, textured 3-D building models may be displayed in a map representation.

Moreover, these web mapping services can also provide street-level views of various locations. In particular, panoramas of stitched images can be displayed upon request, providing a user with a 360° panoramic street-level view of a chosen map location.

Moreover, advanced driver assistance systems for vehicles are designed to avoid collisions and accidents by offering technologies that alert the driver to potential problems, or to avoid collisions by implementing safeguards and taking over control of the vehicle. In particular, driver assistance systems may be configured to recognize objects in the proximity of a vehicle and to warn a driver when there is an imminent collision or take action on anonymously.

However, the level of detailed information provided for three-dimensional structure models in web mapping services as well as in driving assistance systems is limited. In particular, current systems do not provide sufficient information relating to object composition (e.g. what kind of materials are contained in a displayed building façade) or material properties such as a material degradation state or a contamination state of a displayed object.

SUMMARY

It is an object of the present invention to realize a device and a method for analyzing objects, including buildings, build environments and/or environment areas, which allow effectively and in a short time to determine material properties of said objects.

Furthermore, a device and a method for an object analysis and device modeling are proposed that improve the level of available information of a surveyed object and enable a more accurate and detailed model generation of the objects in a rather quick manner.

In order to solve the above-indicated technical object, there is a proposed a device for analyzing objects according to the features of claim 1 and a method according to claim 12. The dependent claims relate to preferred embodiments of the invention.

The invention can be applied to web mapping services charts (e.g. Google maps) or driving assistance systems. However, it is to be noted that the aspects and embodiments may also be applied to different fields, such as maintenance, farming or landscaping operations. Furthermore, application of some of the aspects and embodiments can also be implemented in nautical environments, e.g. degradation state surveillance of ships, boats or oil rigs.

In the following, support for features and aspects of the exemplary embodiments will be given, and advantages will be described. Further advantages and features may become apparent from the later more detailed description of drawings and related exemplary embodiments.

According to an aspect, a device for analyzing objects may be provided. The objects may include or comprise at least one out of buildings, build environments or environment areas. In other words, the objects may include or comprise buildings, build environments and/or environment areas.

For example, objects may comprise streets, highways, rails, bridges or any other infrastructure element. In addition, objects may also comprise houses, skyscrapers, industrial facilities or natural landscape.

In some embodiments, the device for analyzing objects may comprise imaging means. The imaging means may be configured for detecting image data points of said objects.

For example, the imaging means may be any sensor or sensor system (e.g. camera or camera system) capable of detecting or receiving photons, i.e. lightwaves, reflected or emitted by the surveyed object. Such object signals, i.e. radiation signals associated with the surveyed object can be classified as image data points.

Furthermore, the device may comprise assigning means that are configured for assigning spatial coordinates to said respective image data points. In particular, object data points may be obtained via the assignment of spatial coordinates to said respective image data points.

In other words, the device for analyzing objects may comprise assigning means for assigning spatial coordinates to said respective image data points in order to obtain object data points.

For example, the assigning means may comprise a global positioning system/device or any other means for determining a position in space. Accordingly, the collected image data points may be geo-referenced by the device for analyzing objects and a location in space can be allocated to the information collected via imaging means, i.e. the image data points. In addition, assigning means may also comprise one or more computing devices associated with the global positioning system or device. Accordingly, geo-referencing may be enabled via data processing performed on the one or more computing devices.

Furthermore, the device for analyzing objects may comprise means for determining at least material properties of said objects based on said object data points.

Determining means may refer to any device or apparatus enabling the identification or detection of a measurable characteristic of the object. For example, determining means may refer to the capability of measuring or determining temperatures. In addition, determining means may also comprise one or more computing devices for data processing of measured or determined data. Accordingly, properties may refer, for example, to the object temperature, e.g. via thermal imaging. However, properties may be any kind of physical, construction, chemical and/or biological material properties. In addition, properties may also refer, for example, to the geometric shape and/or size of the surveyed object. Moreover, properties may also refer to variation of composition, e.g. a variation of the substance of which the object is made more composed.

In some embodiments, at least spectral library data may be used for said determination. Moreover, said spectral library data may comprise an ensemble of material spectral characteristics corresponding to physical, construction, chemical and/or biological material properties.

For example, spectral library data can be stored on hardware (e.g. a memory device) associated with the device for analyzing objects. In particular, spectral library data may refer to a set or ensemble of prerecorded or predetermined spectral characteristics related to respective materials. For example, the spectral library data may comprise reflection and/or emission spectra, e.g. reflectance distribution dependence of wavelength, for a variety of materials under certain external conditions such as different illumination or humidity conditions. Moreover, the spectral library data may also comprise spectral signatures (e.g. a functional relationship between radiance and/or reflectance and wavelength) related to different degradation states or different physical and chemical states of a multitude of materials. For example, the spectral library data may indicate whether a specific material contains water, ice, snow or any other substance such as rust, moss or even microscopical organisms. Construction or construction properties may refer to specific structural features of an object. For example, in relation to a building, construction may refer to differences in material and geometric composition and/or arrangement of different building segments. In particular, the building roof may be constructed utilizing materials such as wood and/or steel, wherein the building façade may be made out of concrete or bricks. In addition, geometric shape and/or features of building roofs and foundations usually display a variety of differences. Accordingly, construction or construction properties can account for such a variety of geometrical and material properties.

Accordingly, property determination for objects may be performed by comparison and/or other processing (e.g. imaging processing techniques) of the obtained object data points, e.g. the recorded spectral information or signature, with spectral information stored in the spectral library data. In particular, upon matching between the recorded spectral information and spectral characteristics comprised in the spectral library data, a corresponding material property may be assigned. For example, in case the recorded spectral signature matches or coincides with spectral library data indicating glass as material, the device for analyzing objects may output that the probed object comprises or consists of glass. In addition, the spectral library data may also comprise respective spectral characteristics in case glass is covered by water and/or snow. Upon detection of a corresponding spectral signature, the device for analyzing objects may also determine that the probed object comprises or consists of glass covered by water and/or snow. Similar determinations can be performed in view of materials covered by plants (e.g. moss) or other substances (e.g. rust, dirt).

The corresponding comparison and/or other processing and assignment procedure may be performed automatically, e.g. via a computing device.

The property determination indicated above may be performed for all materials that are indicated in the spectral library data with their corresponding spectral characteristics.

Consequently, the device for analyzing objects is capable of gathering or collecting object data points indicating respective spatial positions of objects or object elements associated with their respective object signals as well as information concerning physical, construction, chemical and/or biological material properties of the analyzed object. Hence, detailed information can be provided for the generation of a detailed three-dimensional object model as well as for an accurate surveillance or monitoring of the current state (e.g. properties) of the object.

This information can also be utilized to improve safety and to reduce costs in relation to maintenance or repair of buildings, build environments and/or environment areas. For example, damaged or deteriorated parts of a respective building can be recognized promptly and easily. In addition, the device for analyzing objects also enables a reliable detection whether parts of a building (e.g. entrance door, or windows) are covered by liquid water or frozen water (ice, snow), organic material or other contaminants such as dust, paint, graffiti, minerals, etc.

Furthermore, the level of detail of structures in web mapping services can be improved significantly. In particular, the device for analyzing objects enables a very accurate modeling of buildings, build environments and environment areas in birds eye views and/or street-level views of web mapping services. Hence, navigation and orientation in respect to web mapping services is facilitated considerably.

The material properties may include at least a degradation degree of said object.

For example, a degradation degree may refer to the structural integrity of the material, i.e. whether the material is damaged or worn down, or cracked, covered with other materials or having an uneven heat conductivity.

Preferably, the material properties may include at least a coverage degree, a contamination degree or a humidity degree of said object. In other words, the material properties may include a coverage degree, a contamination degree and/or a humidity degree of said object.

For example, a coverage degree may indicate the amount of coverage of the object by another substance such as water in liquid or frozen form, a chemical composition (e.g. rust) or biological material (e.g. microorganism or plants).

Contamination degree may refer to the accumulation of dirt, dust or other polluting substances on the object. Humidity degree may refer to the different levels of wetness of the object material.

Material property information can be heavily affected by the aforementioned influence degrees. For example, spectral information or thermal information of a material may be altered considerable depending on whether the material is covered by water or not. Similarly, spectral characteristics and/or thermal properties of material can also be altered due to its age. Accordingly, taking into account the influence degrees indicated above enables a more accurate determination of material as well as a reliable detection of the material state, e.g. whether the material is deteriorated or covered or contaminated by another substance. In addition, some materials may be recognized as materials that have been built and/or used only during a certain period. For example, a recognition or detection of hazardous components such as asbestos etc. may be enabled.

Hence, a more accurate analysis procedure is enabled. In addition, a generation of three-dimensional models in web mapping services charts may be adapted in accordance with a change of environmental conditions. For example, seasonal influences (e.g. snow on buildings, build environments and environment areas in winter time) may be indicated in a birds eye view or street view of web mapping services charts. Hence, the level of detail of web mapping services charts can be improved considerably.

The spectral library data may comprise predetermined spectral information. The predetermined spectral information may be associated with a variety of spatial, temporal, atmospheric and illumination conditions and composition variations for a plurality of respective materials.

As already indicated above, the spectral library data may be stored on a memory device associated with the device for analyzing objects. Accordingly, spectral information associated with a plurality of different materials and environmental conditions may be generated via spectral signature measurements (e.g. reflectance and/or radiance dependency on wavelength). For example, for a plurality of different materials spectral characteristics may be recorded depending on characteristics such as signal recording angle (e.g. the angle between the object or object surface and the imaging means of the device for analyzing the object), time of the day (e.g. morning, noon, afternoon, evening or night), weather conditions (e.g. rain, fog, sunshine, snowfall) and lighting conditions (e.g. shadow strength in case the objects is located in a shadow of another structure).

This provides the advantage to distinguish a variety of different materials and material properties under a plurality of environmental conditions. Accordingly, maintenance and/or repair operations and model building can be facilitated.

One or more spectral characteristics that are associated with said objects may be obtained and compared with predetermined spectral information. The material properties of said objects may be determined based upon conformity between the obtained spectral characteristics (i.e. a measured radiation signal originating from or reflected by the object) and the predetermined spectral information.

In other words, a predetermined spectral information taking into account the variety of spatial, temporal, atmospheric and illumination conditions may be generated for any respective material and combined to form spectral library data. Accordingly, a measured signal originating from the object (e.g. a reflected or emitted light beam) may then be compared with the respective spectral characteristics of some or all stored materials. The material properties of the objects (e.g. composition or state of the material) are then identified based upon matching between the recorded spectral characteristics and the spectral library data.

Hence, the process of identifying materials and material properties can be structured more efficiently. In addition, erroneous identification of materials and material properties can be prevented or suppressed. Hence, the analysis and determination procedure of objects becomes more reliable.

Preferably, the object data points may be mapped onto reference coordinates of at least one out of a predetermined land registry chart or a web mapping services chart. In other words, the object data points may be mapped onto reference coordinates of a predetermined land registry chart and/or a web mapping services chart.

For example, a computing device associated with the device for analyzing objects may perform the above-mentioned mapping of object data points onto such reference coordinates. Land registry charts may be obtained via respective data libraries (e.g. from city offices) and may be made available for digital processing of the computing device associated with the device for analyzing objects. Web mapping services charts such as Google maps may be available via the Internet (World Wide Web). Accordingly, the object data points, i.e. the geo-referenced image data points of the surveyed objects, may be mapped onto layouts or floorplans comprised by a land registry chart or a web mapping services chart. Hence, the obtained object data points can be brought into correspondence with the location of the analyzed object according to the land registry chart or the web mapping services chart. In other words, the object data points can be assigned such that their respective location reflects the location of the object in accordance with a land registry chart or a web mapping services chart.

Accordingly, the device for analyzing objects enables matching of object data points with a particular reference system indicated by the land registry chart or a web mapping services chart. Hence, the present invention provides the advantage of generating highly accurate maps and/or floorplans.

In some embodiments, the mapped object data points (Voxels) may be utilized to generate three-dimensional models of the objects. Furthermore, the three-dimensional object models may be scaled in respect to dimensions of the predetermined charts.

Hence, the object data points that are mapped into a particular reference system of a land registry chart or a web mapping services chart may be arranged such that a three-dimensional model of the analyzed object is generated. For example, a computing device associated with the device for analyzing objects may perform the aforementioned arrangement in order to generate a three-dimensional model. The computing device may be associated with the device for analyzing objects when data can be processed and/or exchanged between the device for analyzing objects and the computing device. For example, the device for analyzing objects may comprise the computing device and may be configured to enable processing of data and exchange of data with the computing device.

In order to adapt the three-dimensional object model to the standard or scale of the predetermined chart, the dimensions of the three-dimensional object model may be adjusted or scaled such that the modeled object is in accordance with length dimensions specified by the predetermined chart.

Therefore, the present invention enables the provision of highly accurate three-dimensional object models and a placement or localization of the object models in coordinate systems specified by predetermined charts. Accordingly, highly realistic maps can be realized. Therefore, navigation and orientation according to web mapping services charts can be facilitated. In addition, planning for renovating or building houses can be made more efficient in accordance with a respective three dimensional house model.

Hence, construction or restoration of building structures may be planned more accurately and costs may consequently be saved.

The device for analyzing objects may be comprised by an autonomously and/or non-autonomously moving entity. In other words, the device for analyzing objects may be comprised by at least one out of an autonomously and and a non-autonomously moving entity.

For example, autonomously moving entity may refer to any kind of automatically controlled or remote-controlled robot or robot vehicle. A robot may refer to a machine (e.g. robotic rover, robotic humanoid, industrial robot, robotic flying drone) capable of carrying out a complex series of actions automatically (e.g. moving along a spatial trajectory). In addition, a robot or robotic vehicle can be remote-guided by an external control device or the control may be embedded within the robot. In other words, a robot or robotic vehicle may, for example, function as a non-autonomously moving entity. Alternatively, autonomously moving entity may also refer to a person or user carrying the device for analyzing object along a specified spatial trajectory.

The autonomously and/or non-autonomously moving entity may be at least one out of an airborne vehicle and a terrestrial based vehicle. In other words, the device for analyzing objects may be comprised by at least one out of an autonomously moving entity and a non-autonomously moving entity that is an airborne vehicle and/or a terrestrial based vehicle.

For example, airborne vehicles may be any kind or type of flight capable device such as drones, helicopters, airplanes, balloons, or airships. A terrestrial based vehicle may be any kind of device capable of moving on the ground such as cars or moving frames. In addition, frames such as tripods can be classified as terrestrial based vehicle. Furthermore, in the framework of the present invention also the device for analyzing objects being handhold or carried by a user or operator can be classified as terrestrial based. In particular, the terrestrial based vehicle may be configured to adapt the height position or elevation of the device for analyzing objects in respect to ground level. For example, the device for analyzing objects may be comprised by a movable platform of a framework or tripod (i.e. a platform or tripod that can be moved along a spatial trajectory).

This provides the advantage of generating data from a variety of perspectives and viewing points. Accordingly, the level of detail of the accumulated data is improved.

Preferably, the imaging means may comprise at least one out of a laser scanner, an optical camera, an infrared camera, an imaging spectrometer, an inertial measurement unit, an IPS-sensor (indoor positioning system-sensor), an IBeacon and/or a GPS-sensor.

A laser scanner is a device for the controlled deflection of visible or nonvisible laser beams. Laser scanners allow enhancing of the scanning process and reduce data collection errors. Accordingly, time and money can be saved.

An optical camera is an optical remote sensing device for sensing objects without physical contact. An optical camera may work with the visible spectrum or other portions of the electromagnetic spectrum. Accordingly, characteristics such as color or contrast of an object may be captured utilizing an optical camera. Hence, a realistic representation of the analyzed object is enabled for the generation of three-dimensional models.

An infrared camera or thermographic camera is a device that generates an image using infrared radiation. Accordingly, temperature characteristics of building structures may be recorded. For example, this enables also an analysis of building structures in terms of heat insulation properties. Moreover, thermal radiation information may be utilized to distinguish different structural elements of building structures. For example, thermal radiation information may be utilized to determine or recognize organic organisms (e.g. mold or moss) attached to elements of the analyzed object.

An indoor positioning system (IPS) is a system to locate objects inside a building using IPS-sensors capable of receiving and/or processing radio waves, magnetic fields, acoustic signals, or other sensory information.

An inertial measurement unit (IMU) is an electronic device that measures and reports forces, angular rates and sometimes magnetic fields using a combination of accelerometers, gyroscopes and/or magnetometers.

A GPS-sensor is a receiver with antennas or receiving means that is configured to use a satellite-based navigation system with a network of satellites in orbit around the earth to provide position, velocity and timing information.

An imaging spectrometer may collect information as a set of data units. Each data unit represents a narrow wavelength range of the electromagnetic spectrum, also known as a spectral band. These data units may be combined to form a spectral data cube (N-tuple) for processing and analysis, wherein N−1 components of the N-tuple represent spatial dimensions and the Nth tuple component represents the spectral dimension comprising a range of wavelengths. Hence, spectral and spatial information of an analyzed object can be efficiently represented and a material determination based upon spectral characteristics can be enabled.

Accordingly, the utilization of the imaging means indicated above enables a more realistic object model and map generation. In addition, recognition of deteriorating influences such as mold in building structures can be facilitated. Hence, negative health influences or hazardous conditions for building inhabitants may be recognized and prevented more efficiently.

The object data points may be represented as a set of three-dimensional graphic information units. Each three-dimensional graphic information unit may indicate at least one out of spectral, RGB (red green and blue color) and thermal data information that is associated with a respective spatial coordinate. In other words, each three-dimensional graphic information unit may indicate spectral and/or thermal data information associated with a respective spatial coordinate.

Accordingly, each respective three-dimensional graphic information unit (voxels) may comprise spatial information components. Accordingly, facilitated three-dimensional model building may be enabled. In addition, the spectral information enables the determination of object properties such as optical appearance (e.g. color) and/or an identification of the object material composition. Moreover, thermal data information enables the representation of thermal characteristics of the object model, such as insulation characteristics.

Hence, the information comprised in the object data points can be efficiently represented and/or evaluated. For example, the obtained information may be represented on a computer generated picture or a screen. Therefore, full-scale three-dimensional model building can be facilitated.

Preferably, the object data points may be projected onto a plane. The plane may be parallel to an X, Y-plane associated with the spatial X, Y-coordinates of the object data points. The identification of respective geometric elements of the objects may be supported by the evaluation of data point cluster density distribution in the plane.

The three-dimensional nature of an analyzed object is reflected in the spatial information of the projected object data points. Accordingly, a suppression of the spatial components of each respective object data point results in a projection of all object data points onto a two-dimensional surface or plane. Accordingly, the relative spatial arrangement of the respective object data points is reflected in a data point density distribution or data point cluster density distribution in that projection plane or surface. For example, in a three-dimensional configuration, wherein each object data point is associated with coordinates (X, Y, Z), a projection onto a two-dimensional surface may be performed by setting the Z-component of each object data point to zero. Accordingly, all data points are "projected" into the X,Y-plane. Therefore, the projected object data points form clusters of varying densities in the plane. In other words, the projected data points generate a data point (cluster) density distribution within the plane.

Hence, the identification of geometric elements and/or structures of the analyzed object may be supported or facilitated by the evaluation of the data point density distribution in the projection plane.

Preferably, the identification may be realized by only considering densities above a predetermined density threshold. Accordingly, a faster identification of said elements and/or structures is enabled.

Preferably, the device may be configured to extract fine object structures from the object data. In particular, the device may be configured to identify one or more object surfaces from the density distribution. In addition, the device may be configured to extrapolate an exterior contour of the object surface. Moreover, the device may be configured to extract a characteristic line of the contour. Furthermore, the device may be configured to determine geometric 2-D properties of the characteristic line and to extract all the lines with the same properties regardless of their density. Furthermore, the device may be configured to determine areas with geometrical properties in the same range as compared to the determined geometrical properties in order to construct a set of linearly dependent two-dimensional points. The order of the steps indicated above, may be exchanged in view of procedural requirements.

Accordingly, there are two main steps for creating a three-dimensional model.

In a first step, a (building) point cloud is generated from the image data. Subsequently, the point cloud is divided into meaningful building structures. Hence, several segments of the point cloud may be labeled as façade, roof, floor.

In the following, a more detailed description of the segmentation process indicated above is provided. At first, the building point cloud can be separated into e.g. two parts. One part contains points that are associated with vertical structures of the surveyed building (e.g. façades). Another part comprises all other points.

Next, the point cloud associated with vertical structures is projected onto the XY-plane. From this projection picture all parallel lines are detected and extracted. In general, lines corresponding to façades will have more points, i.e. the density of points in the projection plane will be higher for points corresponding to façades. These lines are detected according to density criteria and are called dominant or characteristic lines. Generally, other lines which are not dense enough to be automatically detected or extracted (e.g. via computational means), but are nevertheless relevant to the final result, have the same direction as the dominant or characteristic lines. For example, dormers, stairs, and chimneys normally have planes parallel to at least one façade. Accordingly, these lines can be classified as being important based on their direction. In particular, potential stairs can be detected as a group of parallel lines of approximately same length and situated at a same or matching distance from each other (usually the distance being smaller than 60 cm). Accordingly, features corresponding to stairs etc. can easily be identified within the point cloud utilizing a projected point cloud density profile.

As indicated above, each line (i.e. the lines identified with increased density distribution of the projected data points in the plane) corresponds to a vertical structure that was projected on the XY-plane. These lines are extruded in the z-direction. Then, for each line a grid is created with a height corresponding to the building height. Subsequently, a search in the building point cloud is performed across all points of the grid. In particular, it is checked for each point whether the normal of the respective point, i.e. the normal vector associated with the point, corresponds to the normal vector of the grid plane. Using the grid and the search result, an image of the façade is created that can later be utilized to relate to spectral characteristics of the building. Accordingly, all points in the façade can be labeled with material information associated with spectral characteristics. This process can be performed for each vertical structure identified in the point cloud data.

In a second step directed to the detection of roof planes, points are identified that correspond to a roof plane. To identify such roof plane points, it is utilized that in general all façades in a building intersect with the roof. Accordingly, a point belonging to or being positioned on an intersection between a façade segment and the roof belongs to both, i.e. the façade and the roof. Hence an identification of a point corresponding to roof plane can be performed.

Next, a boundary line, i. e. a roof line embedded in the set of roof plane points is defined. For example, the roofline can be specified by points lying on the intersection between a façade segment and the roof. However, any line in the contour of the façade can be utilized. Subsequently, all points in the roof point cloud, which are situated in a predetermined vicinity from the roofline are extracted. For example, the distance from the roofline can be 80 cm. Then a plane is fitted through these extracted points in order to obtain plane coefficients (a, b, c, d) in accordance with the equation a $X$+b $Y$+c $Z$+d=0 (equation a)).

Next, all points are found that are on this plane. In other words, all the points that match the approximation of the roof plane, given by equation a) are checked.

Moreover, a plane in the newly found points is refitted. Accordingly, new coefficients (a', b', c', d') in accordance with the equation a' $X$+b' $Y$+c' $Z$+d'=0 (equation b)) are obtained.

The procedure of finding all points on the plane as well as refitting a plane and the newly found points, is repeated until all points corresponding to this roof planes are found.

Accordingly, the roof plane can be extracted in an efficient and simple way.

In the final step, identified roof planes, façades and extracted geometric building features are put together in order to generate a three-dimensional coarse model of the building. Additional information obtained from spectral, optical and/or thermal imaging devices can be incorporated into the model in order to generate realistic three-dimensional object models.

The evaluation of data point cluster density distribution may be utilized to support the generation of at least one out of interior fine structure, exterior fine structure or construction of the three-dimensional object models. In other words, the evaluation of data point cluster density distribution may be utilized to support the generation of interior and exterior fine structure and/or construction of the three-dimensional object models.

Accordingly, the identification of layouts or aspects of the interior structure of the buildings (e.g. staircases) as well as subtle details of the external structure (e.g. gables or bay windows) may be identified by utilizing the information comprised by the data point density distribution. Therefore, three-dimensional models may be generated with an increased level of detail.

According to another aspect, there may be provided a method for analyzing objects. The objects may include at least one out of buildings, build environments and environment areas. In other words, the objects may include buildings, build environments and/or environment areas. In addition, the method may comprise the step of detecting image data points of said objects. Furthermore, the method may comprise the step of assigning spatial coordinates to said respective image data points in order to obtain object data points. The method may further comprise the step of determining properties of said objects based on said object data points. Preferably, the method may at least utilize spectral library data for said determination. The said spectral library data may comprise an ensemble of material spectral characteristics corresponding to at least one out of physical, construction, chemical and biological material properties. In other words, the said spectral library data may comprise an ensemble of material spectral characteristics corresponding to physical, construction, chemical and/or a biological material properties.

Consequently, the method for analyzing objects enables gathering or collecting of object data points indicating respective spatial positions of object elements as well as information concerning physical, chemical and/or biological material properties of the analyzed object. Hence, the method enables the provision of data for the generation of highly detailed three-dimensional object models. Moreover, the method further enables a surveillance or monitoring procedure determining an object state.

Preferably, the object data points may be mapped onto reference coordinates of at least one out of a predetermined land registry chart and a web mapping services chart. In other words, the object data points may be mapped onto reference coordinates of a predetermined land registry chart and/or a web mapping services chart. Moreover, the mapped object data points may be utilized to generate three-dimensional models of the objects. In addition, the three-dimensional object models may be scaled in respect to dimensions of the predetermined chart.

Therefore, a method is provided enabling the generation of highly accurate and realistic three-dimensional models embedded in predetermined maps and/or charts.

BRIEF DESCRIPTION OF THE DRAWINGS

In the following the invention will further be explained based on at least one preferential example of the invention with reference to the attached exemplary drawings, wherein.

DETAILED DESCRIPTION

Figure 1:
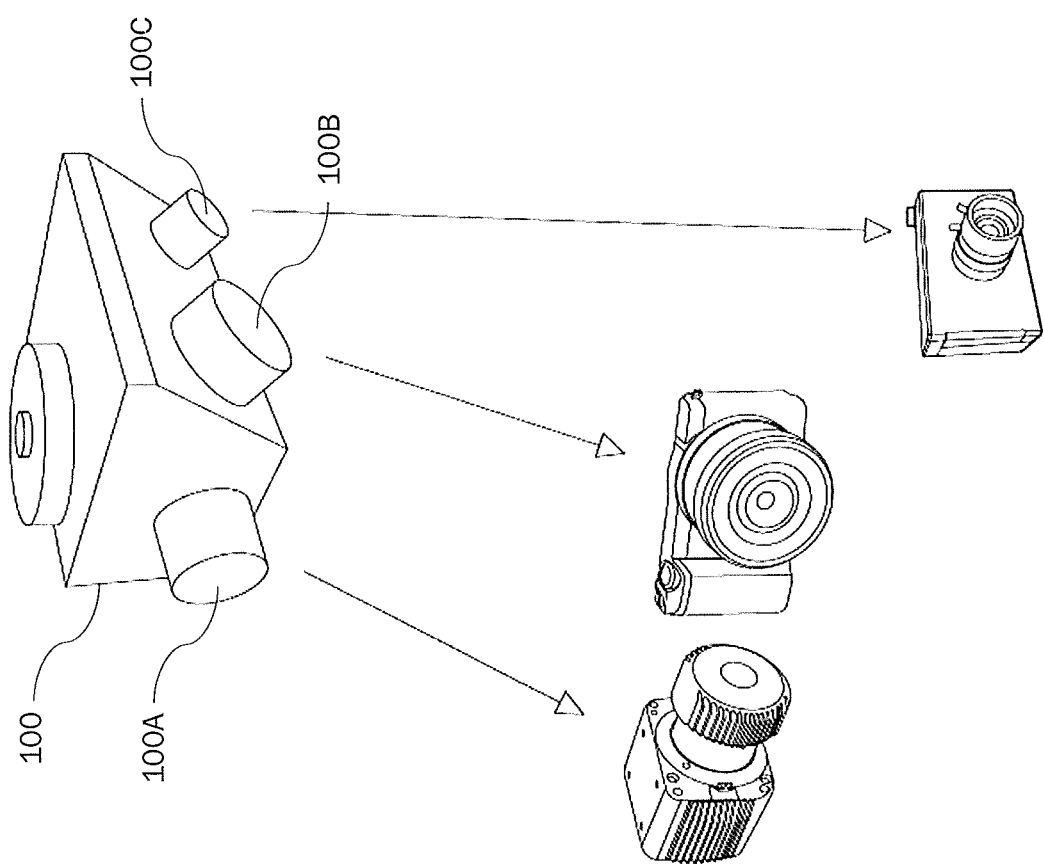
FIG. 1 schematically depicts exemplarily imaging means for scanning and/or analyzing objects, FIG. 2 schematically depicts a survey or data accumulation situation of the device for analyzing objects.

In the following, preferred aspects of the invention will be described in more detail with reference to the accompanying figures. Same or similar features in different drawings are referred to by similar reference numerals. It is to be understood that the detailed description below relating to various preferred aspects of the invention are not to be meant as limiting the scope of the present invention.

FIG. 1 exemplarily depicts a device 100 for analyzing objects. In particular, it is shown that the device 100 comprises a laser scanner 100A, a camera 100B and a spectral sensor 100C. The device 100 for analyzing objects may be spatially rotatable such that the laser scanner 100A, the camera 100B and the spectral sensor (imaging spectrometer) 100C may be aligned in order to be capable of receiving signals from any direction. In the depicted example the geometry or geometric shape of a surveyed or analyzed object 200 (e.g. a building or building structure) can be determined utilizing the laser scanner 100A and/or the camera 100B. In particular, the camera may be utilized in order to provide optical imaging of a surveyed object. In other words, an optical image or photography may be provided via the camera 100B. In order to provide spatial (three-dimensional) information of the surveyed object, overlapping photos taken from different device 100 positions relative to the surveyed object can be combined, e.g. via an associated computing device. In other words, a photogrammetric point cloud can be generated comprising optical and spatial information concerning the surveyed object.

The laser scanner 100A may be configured to emit laser light towards an object to be surveyed and to detect returned or reflected laser light from the surveyed object. Accordingly, the distance between the device 100 and the surveyed object or a particular element or segment of the surveyed object can be determined accurately via signal running time, i.e. laser scanning. Hence, the geometric shape of the surveyed object can be determined accurately. Accordingly, a laser scanned point cloud can be generated comprising spatial information concerning the surveyed object. In addition, the laser scanner may comprise a GNSS-sensor (global navigation satellite system) and/or an inertial measurement unit for enabling the device 100 and/or the laser scanner 100A to determine its position and/or spatial alignment.

Furthermore, the exemplarily depiction of the device 100 for analyzing objects comprises a spectral sensor 100C configured for spectral imaging processes. Spectral imaging collects and processes information from across the electromagnetic spectrum. The objective of spectral imaging is to obtain the spectrum for each pixel in an image, with the purpose of finding object features and materials. In spectral imaging, the recorded spectra have predetermined length resolution and cover a wide range of wavelengths. In particular, spectral sensors collect information as a set of image objects. Each image object represents a narrow wavelength range of the electronic spectrum (a spectral band). These image objects are combined to form a three-dimensional spectral data cube for processing and analysis. For example, a respective three dimensional spectral data cube may have the components (X, Y, λ), wherein the X, Y-components may correspond to spatial dimensions of the object surface (e.g. surface coordinates on the surveyed object) and λ represents the spectral dimension comprising a range of wavelengths. Hence, detailed spectral information of a surveyed object can be gathered. This spectral information can be combined with the information gathered by the laser scanner 100A and/or the camera 100B of the device 100. In other words, image data points of a surveyed object, i.e. a data point cloud comprising information relating to geometric shape and spectral properties of the surveyed object, can be generated.

In addition, the device 100 may also comprise geolocation means such as a global navigation satellite system (e.g.

GPS-system), IPS-system (indoor positioning-system) and/or an inertial measurement unit. Therefore, the collected data regarding the surveyed object can be geo-referenced. In other words, every point of the set of image data points, i.e. the point cloud data, can be associated with an exact geolocation. Accordingly, a set of object data points can be generated, which enables an accurate three-dimensional modeling of the surveyed object in relation to pre-determined reference coordinates such as land registry charts or web mapping services charts.

Figure 2:
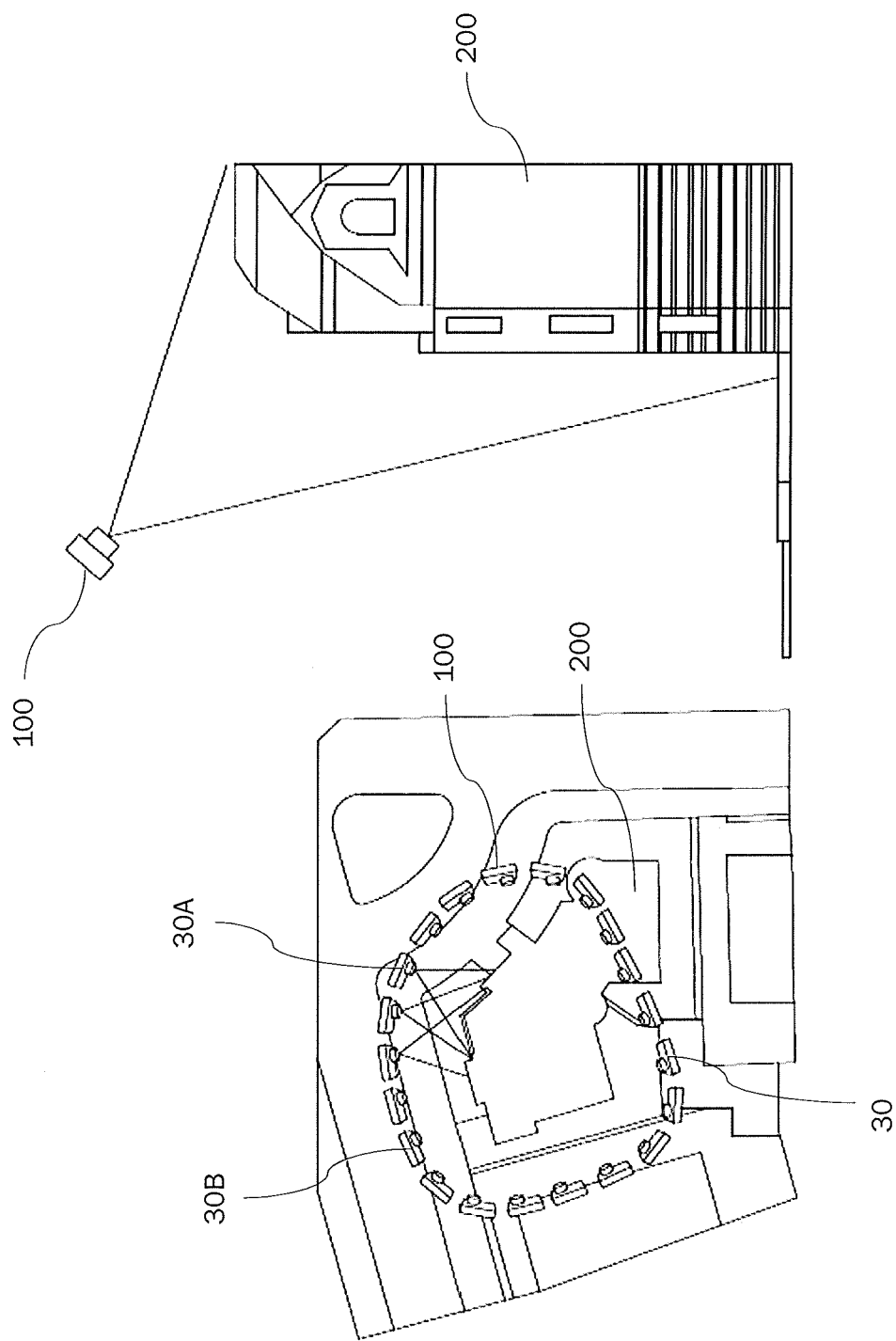

FIG. 2 exemplarily depicts a process of data gathering or surveying of an object 200 (e.g. a building) via the device 100. In particular, the device 100 can be mounted on an airborne vehicle (e.g. a remote-controlled or autonomously driven drone) or can be mounted on a terrestrial based movable vehicle or frame. Accordingly, the object (e.g. building) is successively scanned or surveyed from a variety of different positions 30A, 30B, 30C. The accumulated data is then combined by the device 100 (e.g. via a comprised computing device (not depicted)) or externally by a computing device (not depicted) in order to generate object data points. In other words, the imaging means (e.g. camera 100, laser scanning device 100A and/or the spectral sensor 100C) are utilized to generate image data points, i.e. optical, geometrical and spectral information of the surveyed building. In addition, the geo-referencing means (not depicted) of the device 100 geo-reference the image data points, which results in the generation of object data points. In other words, any image data point comprising optical, geometrical and spectral information of the surveyed object (e.g. building) is geo-referenced, i.e. provided with respective geolocation information.

Figure 3:
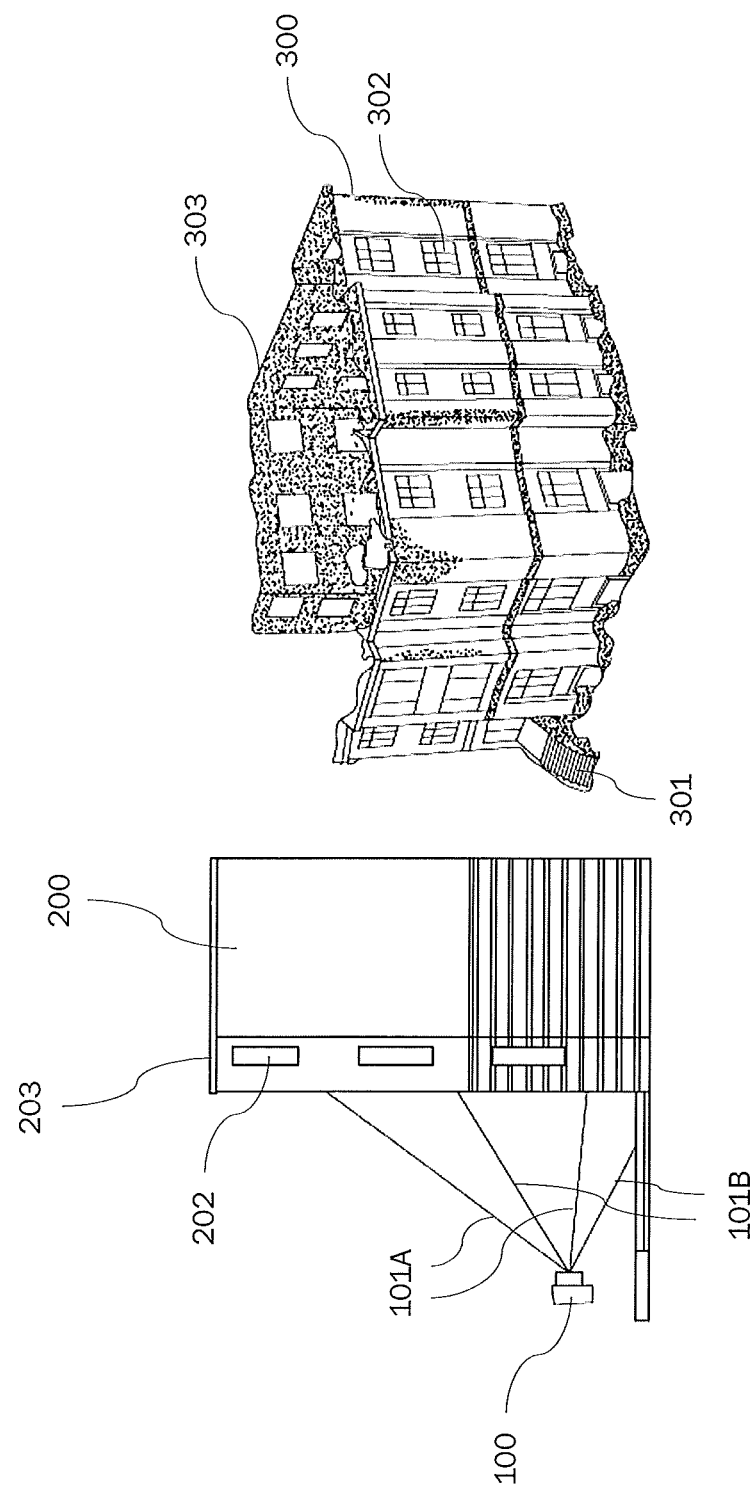
FIG. 3 depicts and exemplarily situation, wherein object data points are obtained, mapped and scaled according to predetermined reference coordinates, FIG. 4 schematically depicts a set of spectral signatures comprised by a spectral library, wherein different spectral distributions are associated to different materials, FIGS. 5A, B, C exemplarily depict collected spectral data associated with a building surface and the evaluation of material properties according to the collected spectral data, FIG. 6 schematically depicts the projecting process of spatial data onto a plane and the identification of object elements according to an evaluation of data point cluster density distribution in the plane, FIG. 7 schematically depicts a method for analyzing objects and determining material properties.

FIG. 3 exemplarily depicts the generation of a three-dimensional model 300 of the surveyed object 200 (e.g. building) from the accumulated data of the device 100. The generation of a three-dimensional model 300 of the object 200 can be performed utilizing a computing device (not depicted). Furthermore, the generated three-dimensional model 300 may be displayed or output on any display means (e.g. TV or computer screen (not depicted)).

As illustrated in FIG. 3 the device 100 performs a survey of the object 200. In particular, the building 200 is surveyed via laser scanning 101A and photographic imaging 101B. Furthermore, the device 100 is also configured to record spectral data of the building 200 (not depicted). Accordingly, the distance between the surface of the object 200 and the device 100 can be determined and optical as well as geometrical features or shape of the building 200 can be identified. In particular, structures such as geometric shape of the building wall, windows 202 or the building roof 203 can be identified. Moreover, differences in color and material composition can be extracted. From the accumulated data a three-dimensional building model 300 is generated based upon the optical, spatial and spectral information, i.e. the object data points. In addition, the three-dimensional object model 300 can be mapped into a predetermined reference system. In particular, for such a mapping procedure all object data points (i.e. the geo-referenced image data points) are provided with respective coordinates in the predetermined reference system. Based upon the information comprised in the respective object data points, the three-dimensional object model 300 is generated. In particular, spectral library data (which may be stored in a database or memory associated with the device 100) is utilized in order to identify material or material properties of the building 200 and to reflect these structures in the three-dimensional object model 300. In addition, these data can also be used to increase position accuracy. For example, according to information comprised by the spectral library data (not depicted), the three-dimensional object model 300 can reflect different structures and materials such as modeled glass windows 302, a staircase 301, a roof border 303. In addition, based upon spectral library data information the three-dimensional object model 300 may also take into account whether surfaces of the building façade are covered by water, snow, ice, contaminants or organic material (not depicted).

Furthermore, the three-dimensional object model 300 is scaled according to predetermined standards. For example, when the three-dimensional object model 300 is mapped into particular coordinates of a web mapping services chart, the object model 300 is also scaled accordingly. Hence, a realistic insertion of the three-dimensional object model 300 into the depiction of a web mapping services chart is enabled.

Figure 4:
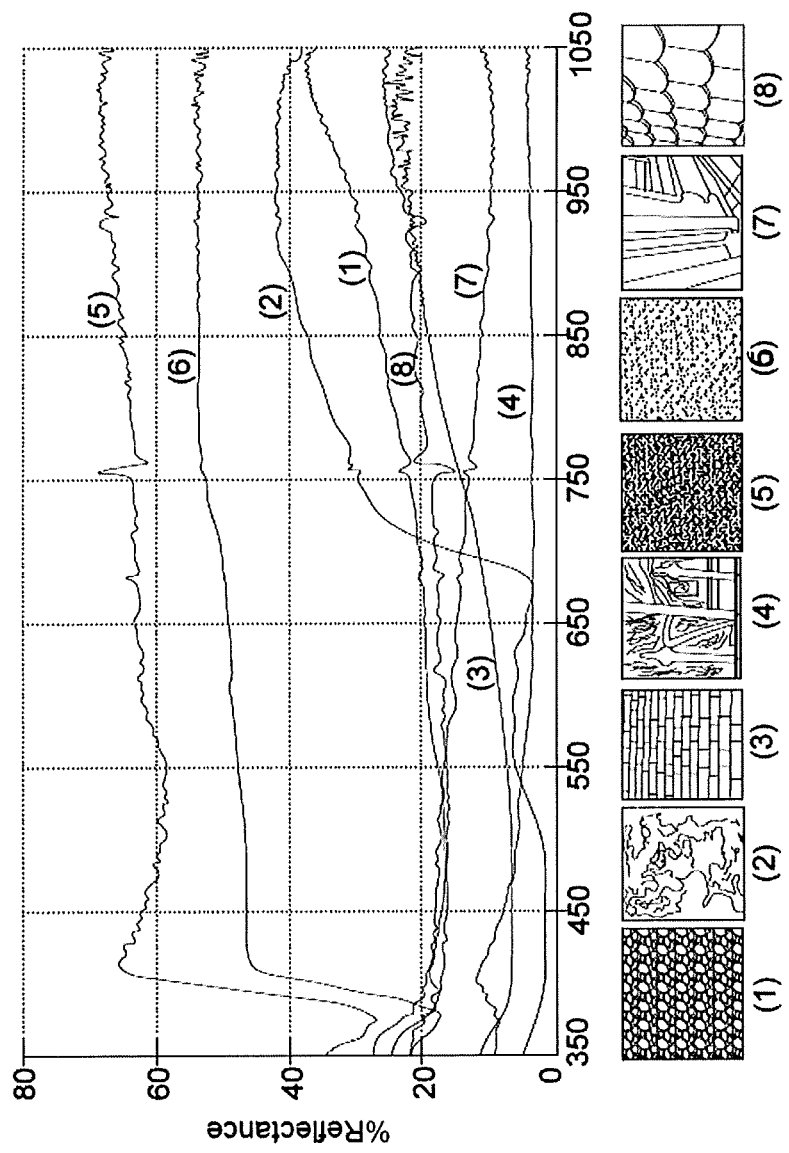

FIG. 4 depicts an illustrative example of a set of spectral signatures comprised by spectral library data. The spectral library data may be stored in a memory or storage facility (e.g. database) that is accessible by a computing device configured to process spectral information. In particular, such a computing device can be configured to compare collected spectral data with the spectral library data in order to determine respective material properties from such a comparison. The computing device may be comprised by the device 100 for analyzing objects. Alternatively, the device 100 for analyzing objects may be associated with a computing device such that imaging data can be made accessible for the computing device. For example, the device 100 for analyzing objects may be connected with a computing device via a communication link.

Specifically, FIG. 4 shows exemplarily an ensemble of eight materials and their respective corresponding spectral characteristics (i.e. a dependency of reflectance percentage over a wavelength range of 350-1050 nm) comprised in exemplarily spectral library data. In particular, item (1) relates to gravel sand wall and its associated spectral behavior, (2) relates to organic material (plans or moss) that grows on a wall and its associated spectral behavior, (3) relates to a brick wall and its associated spectral behavior, (4) relates to an iron fence and its associated spectral behavior, (5) relates to white plaster and its associated spectral behavior, (6) relates to white paint on a wooden frame and its associated spectral behavior, (7) relates to a metal rain the pipe and its associated spectral behavior, and (8) relates to roof tiles (brick or concrete) and its associated spectral behavior.

In fact, corresponding spectral data can be gathered and stored for a variety of different materials. In addition, spectral characteristics for each material can be gathered reflecting different environmental conditions such as different illumination levels (e.g. different times, shadow levels) or different atmospheric conditions (e.g. fog or rain). Accordingly, spectral library data can be utilized for an exact and reliable determination of surveyed object material or material properties.

FIG. 5A illustrates the process of utilizing spectral library data for the determination of material or material properties of a surveyed object 200 (e.g. building 200). In particular, FIG. 5A depicts an image of a building 200 with different areas 202, 202A, 204A, 204B, 205 and 206. Moreover, an associated spectral characteristics diagram is depicted. As can be seen from FIG. 5A each material represents a different spectral signature. Accordingly, the difference between the varying depicted spectral characteristics are related to different spectral features associated with the respective material. Accordingly, the difference in spectral characteristics can be utilized in order to reliably determine the specific material composition of a surveyed object area.

For example, as depicted in FIG. 5A the brick wall 204 of the building 200 comprises a segment of dry brick wall 204B and of wet brick wall 204A. As can be seen in the spectral distribution graph the spectrum for the dry brick wall area 204B and the wet brick wall area 204A are similar but reflect small differences across the depicted wavelength range. Accordingly, information comprised in the spectral library data can be utilized to determine that the material of the building wall 204 is the same in the areas 204A and 204B. In addition, it can be inferred that the material, i.e. the brick stone, in the two areas 204A and 204B has different levels of wetness or humidity.

Furthermore, the image of the building 200 displays areas 202 in the brick wall 204 corresponding to window openings. In addition, in another segment of the building 200 adjacent to the brick wall 204 areas 202A can be recognized. According to the information available in the spectral distribution graph (204B, 204A, 205, etc.) the spectral characteristics of the areas 202 and 202A are the same. Hence it can be determined that the depicted areas 202 and 202A are comprised of the same material (window glass).

Moreover, the building 200 comprises an area 205 which, according to the corresponding spectral data, is made of steel. As can be also inferred from the photography, in front of the building 200 an area 206 is visible comprising vegetation.

Therefore, a reliable identification of materials and their physical state (e.g. wet or dry) can be performed.

FIG. 5B shows in detail how information concerning material composition and materials state of a surveyed object 200 can be utilized for realistic model building. In particular, the photography of the building 200 is classified according to information received via spectral imaging. As can be seen in FIG. 5B, areas with the same spectral characteristics are assigned the same material and materials state. For example, the area 204B characterizes dry brick in accordance with the comparison of spectral library data and recorded spectral characteristics. Similarly, the area 204A is classified as wet brick wall. In addition, areas 205 can be identified as made of steel. Moreover, areas 205 are identified as made of glass. In addition, vegetation (e.g. trees or bushes) are identified with areas 206.

Accordingly, it is possible to generate precise models of a surveyed object 200 reflecting material composition as well as material state.

Figure 5C:
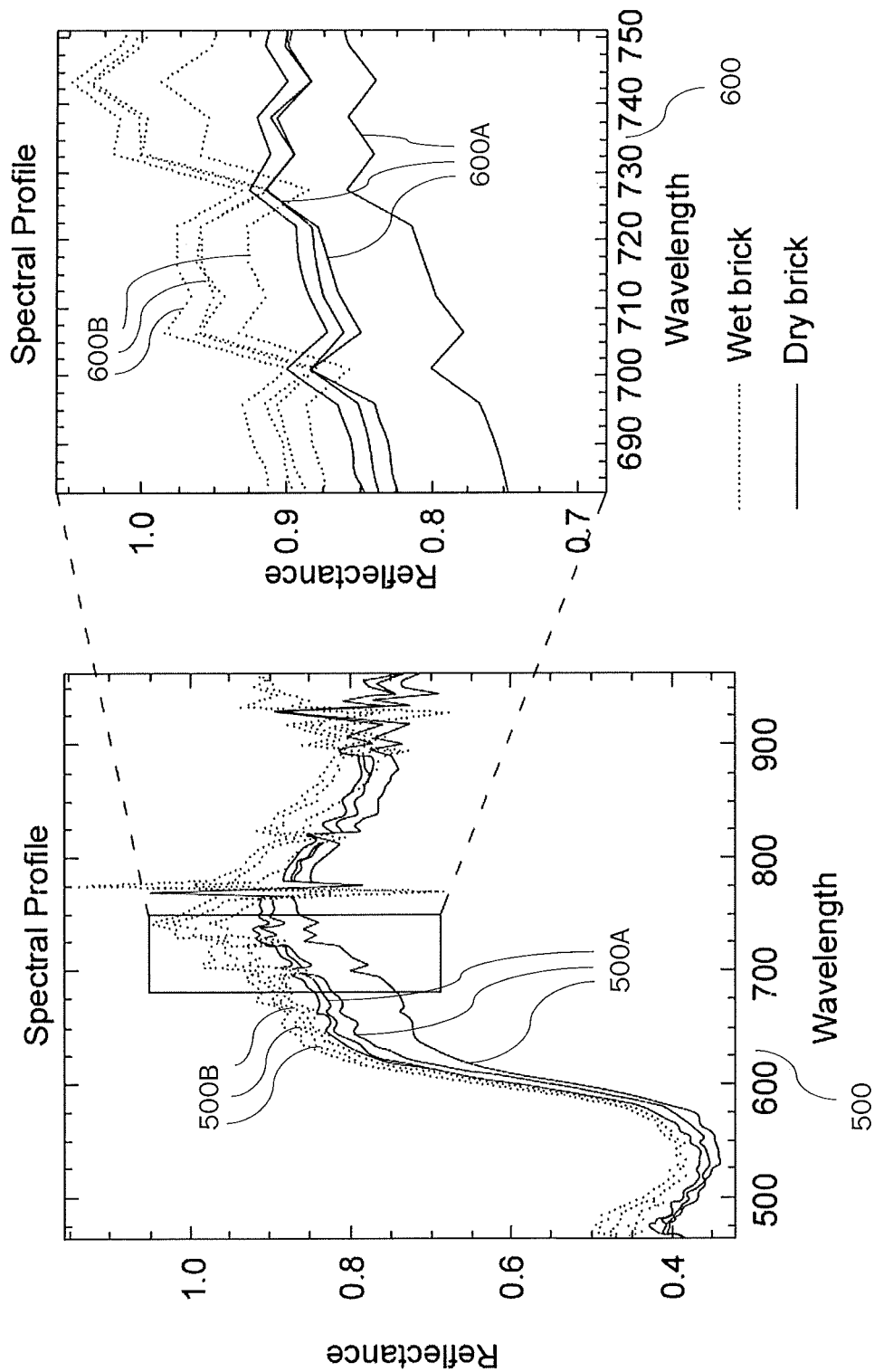

FIG. 5C depicts schematically the process of specifying material properties (e.g. material and/or materials state) in accordance with comparison of predetermined spectral library data. In particular, FIG. 5C shows a spectral profile or reflectance graph 500 (i.e. a functional relationship between wavelength and reflectance). Reflectance of the surface of a material is its effectiveness in reflecting radiant energy. In particular, it is the fraction of incident electromagnetic power that is reflected at a surface of the object. As indicated in FIG. 5C, the reflectance spectrum or spectral reflectance curve is the plot of the reflectance as a function of wavelength. The depicted wavelength range extends from approximately 500-900 nm. However, a different wavelength regime or range may also be chosen. Moreover, diagram 500 displays an ensemble of spectral or reflective profiles 500A, 500B. In particular, the depicted spectral profiles 500A correspond to spectral recordings or measurements of a specific material recorded or measured on the various external conditions (in this particular case wet brick stone). For example, the respective depicted spectral profiles 500A correspond to reflected radiant energy (i.e. light or electromagnetic waves) recorded from different angles and/or illumination levels of wet brick stones. Correspondingly, the spectral profiles 500B corresponds to reflected radiant energy recorded from different angles and/or illumination levels of dry brick stones.

The specific process of identification of the material and/or material state of the surveyed object according to the device for analyzing objects is explained in detail in correspondence to diagram 600. Diagram 600 shows an enlarged segment of the diagram 500. In particular, diagram 600 depicts an enlarged section of the spectral profiles 600A, 600B (the enlarged segments of spectral profiles 600A, 600B correspond to the respective spectral profiles 500A, 500B). The spectral range of the enlarged spectral profile segment extends from approximately 690-750 nm (wavelength). As can be seen from diagram 600, the particular course or function of the spectral profiles of graphs 600B correspond or match to a certain degree within the wavelength range of approximately 690-750 nm. Analogously, the functional distribution of the graphs 600A also matches or corresponds to a certain degree in the respective wavelength regime.

Accordingly, identification of an object material or material state of an object is performed in correspondence with predetermined spectral characteristics or information associated with brick stone. In particular, the spectral library data contains information concerning the spectral profile distribution of respective materials in one or more wavelength regimes. In addition, the spectral library data also comprises information concerning the spectral profile distribution of a material for a variety of physical states and/or external conditions such as diverse degrees of illumination. For example, the spectral behavior for dry brick stone can be stored for multiple wavelength ranges or regimes. Analogously, the spectral behavior for wet brick stone can also be stored for a variety of wavelength regimes in the spectral library data. Upon recording of measurements, i.e. the recording of reflected radiant energy, the device for analyzing of objects can match the recorded spectral characteristics with the predetermined spectral information in the spectral library data. In particular, the predetermined spectral behavior in a given wavelength regime is compared with the recorded spectral information in the corresponding wavelength regime. When the spectral distribution or spectral profile of the recorded spectral profile coincides or corresponds to a distribution comprised in the spectral library data within the same wavelength regime, the device for analyzing objects assigns the material that is associated with the spectral information in the spectral library data. Similarly, the physical state can be determined. In particular, the spectral library data comprises spectral characteristics associated with a variety of material properties (e.g. physical states of materials). Upon recording reflected radiant energy, the spectral characteristics of the measured quantity can be compared with information of the spectral library data. Depending on the specific distribution of the spectral distribution in one or more wavelength regimes, a corresponding material property or materials state is assigned. For example, as can be seen in diagram 600 the spectral graphs 600A display a similar functional behavior in the wavelength range of approximately 690-750 nm. Accordingly, based upon the predetermined spectral library data, the device for analyzing objects determines that the spectral graphs 600A corresponds to brick stone in a wet condition or state. Analogously, the device for analyzing objects can determine that the spectral graphs 600B corresponds to brick stone in a dry condition or state.

The differences of the respective spectral profiles 600A and 600B are due to different lighting (illumination) conditions and/or varying measurement angles and different material compositions. However, the determination process for a specific material or material property is based upon a specific (predetermined) spectral distribution or pattern within a specific wavelength regime. Accordingly, a reliable and error-prone identification of materials and/or material properties (in the depicted case wet or dry brick stone) is enabled.

Figure 6:
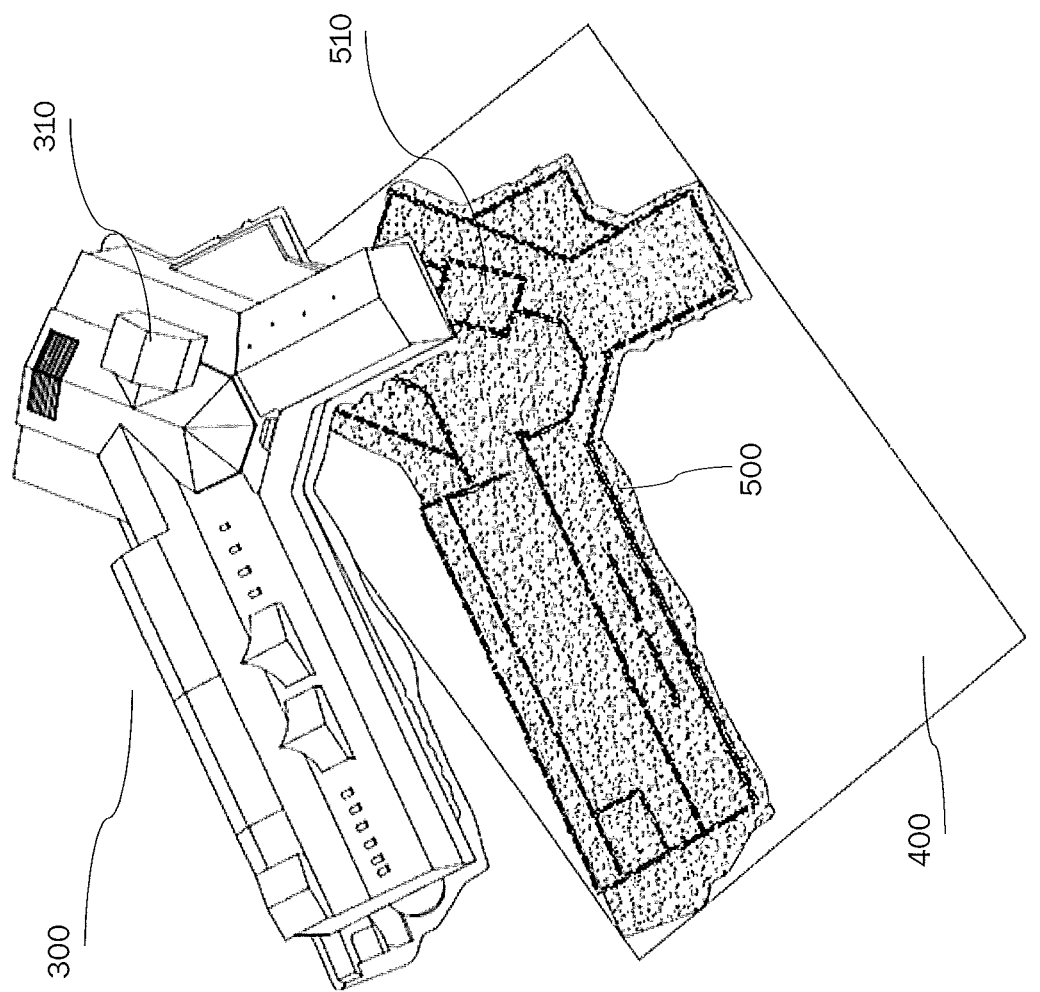

FIG. 6 schematically depicts a three-dimensional building model 300 and its projection onto a two-dimensional surface. In particular, the model is generated by utilizing a plurality of object data points. In other words, the respective data points comprise optical and spatial or geolocation information.

Accordingly, every data point comprises three-dimensional information, e.g. associating tuple of (X, Y, Z)—coordinates in a predetermined reference frame to each respective data point. A projection onto a plane 400 (2-D surface) is performed by setting the Z-coordinates of each respective data point to zero. Accordingly, the data points generating the three-dimensional building model 300 "fall" into the plane. In other words, every data point is mapped into its respective position in the plane (projection surface) 400. Consequently, a data points (cluster) density distribution 500 or a plurality thereof is generated within the plane 400. The density distribution 500 is formed by the data points in the plane 400.

Accordingly, vertical structures associated with a cluster or accumulation of data points in three dimensions such as, for example, gable 310 can be identified via their respective density profile 510 in the projection plane 500. Therefore, the identification of object structures can be facilitated by utilizing the aforementioned density distribution evaluation. For this purpose a section surface onto which the object data points are projected can be aligned at any orientation. The depicted situation of FIG. 6 is merely one example of a particular choice for a section surface or projection surface alignment. The projection surface 400 of FIG. 6 or preferably its surface normal can be rotated by any spatial angle and a corresponding projection of object data points onto such a newly aligned projection plane 400 may be performed in order to obtain a variety of data point cluster density distribution profiles. By using the surface normal the computation time can be further reduced strongly. Furthermore, a resolution of the 3D structure of the corresponding object can be improved.

Hence, an identification of object features or structures is enabled even in circumstances where the data provided by the imaging means, i.e. the image data points, lack accuracy. Therefore, the edification of respective geometric elements of the objects utilizing a relation of data point cluster density distribution in a projection plane serves as noise reduction or error avoidance means. Accordingly, the quality of three-dimensional models for objects 200 can be improved considerably.

Figure 7:
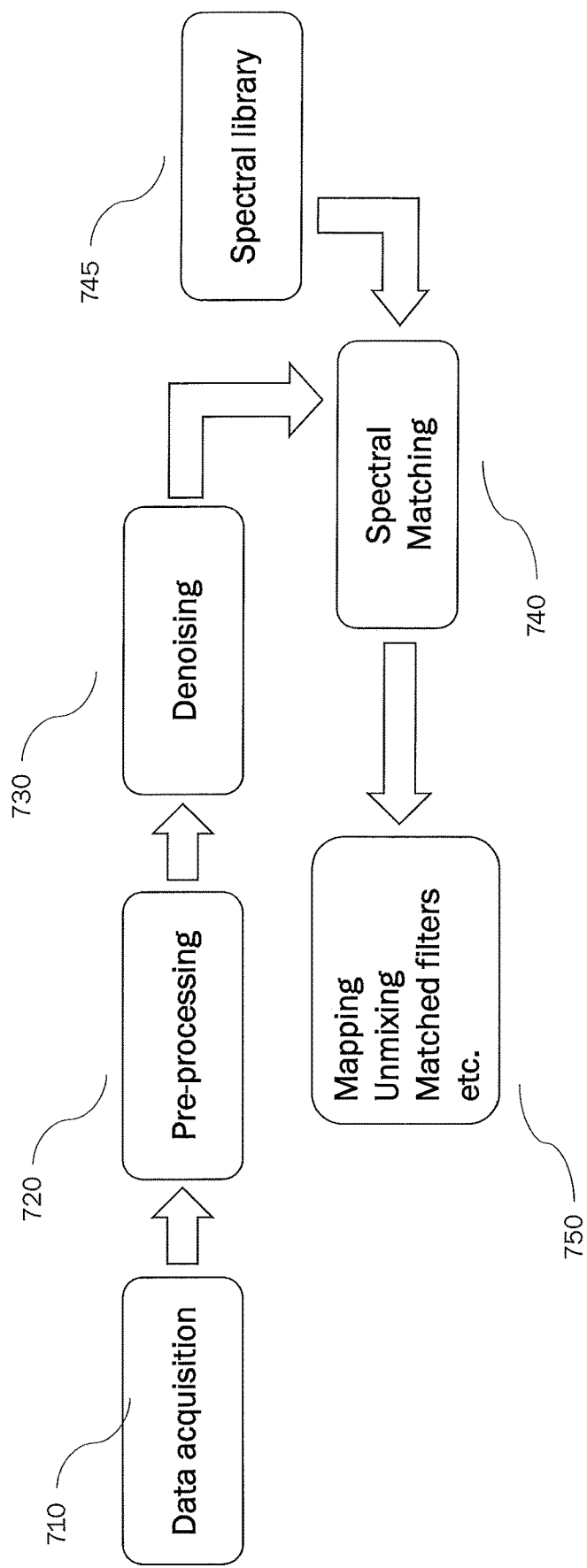

FIG. 7 schematically depicts a method or spectral data analysis workflow for analyzing an object and/or object properties.

The method starts with a data acquisition step 710. In particular, object data are gathered or measured in step 710. In addition, the object data comprises geolocation information. Geolocation or geo-reference information may be provided via GPS sensor means, IPS sensor means and IMU means.

In step 720 the accumulated object data, i.e. the information associated with the surveyed object, is preprocessed. For example, the preprocessing of the object data may undergo one or more steps of cleaning, normalizing, or transforming the object data. In addition, preprocessing may comprise extraction and/or selection of certain object features. The preprocessing step may be performed utilizing a computing device (not depicted) that is associated with the device for analyzing objects.

In step 730 a noise reduction step is performed. In general, noise reduction is the process of removing noise from a signal. Noise can be random or white noise with no coherence, or coherent noise introduced by the device for analyzing objects or the preprocessing step.

In step 740 spectral matching is performed. In other words, by utilizing information comprised in the spectral library, the object data (which has previously undergone a noise removal process) can be associated with specific object information comprised by the spectral library (step 745). The spectral library can, for example, be implemented on a storage device associated with the computing device. In addition, the computing device may be comprised by or associated with the device for analyzing objects. In particular, the spectral library data may comprise spectral information or spectral characteristics enabling an identification of object materials or material properties based upon spectral characteristics comprised by reflected or emitted object radiation. Accordingly, the spectral part of the object data is matched with the information comprised by the spectral library and a respective object material or material property of the object is assigned. In other words, a spectral matching process or step 740 identifying a respective object material and/or material property can be performed.

Subsequently, in step 750 a variety of process steps may be performed. For example, the data set comprising the object data associated with respective object materials and/or properties may be mapped onto a predetermined reference system such as a web mapping services chart (e.g. Google maps). In addition, a three-dimensional model of the surveyed object may be generated in respective coordinates of the predetermined reference system (not depicted). Moreover, additional processing steps such as unmixing and matched filtering may be performed. For example, temperature information also comprised by the object data may be removed or filtered in order to emphasize information contained in the visible regime (approximately 400-700 nm) of the electromagnetic spectrum. Hence, object model information can be specified or displayed in accordance with different wavelengths or spectral ranges.

While the above describes a particular order of operations performed by certain embodiments of the invention, it should be understood that such order is exemplary, as alternative embodiments may perform the operations in a different order, combine certain operations, overlap certain operations, or the like. The above examples, aspects and/or embodiments of the invention can be combined in any way partly or as a whole.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, optically readable digital data storage media, or Internet cloud solutions. The embodiments are also intended to cover computers programmed to perform said steps of the above-described methods.

In addition, it should be noted that the functions of the various elements described in the present patent document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, such as graphical card processors may also be included.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A device for analyzing objects, including buildings, build environments and/or environment areas, comprising:
    an imager for detecting image data points of said objects, wherein the imager includes:
        an imaging spectrometer;
        at least one of a laser scanner, an optical camera, or an infrared camera; and
        at least one of an inertial measurement unit, an indoor positioning system (IPS) sensor, or a global positioning system (GPS) sensor;
    a computer coupled to the imager, wherein the computer includes a processor coupled to a non-transitory computer-readable medium having instructions thereon which, when executed by the processor, cause the computer to:
    assign spatial coordinates to said respective image data points in order to obtain object data points; and
    determine at least material properties of said objects based on said object data points, wherein at least spectral library data stored in a database or in a memory associated with the device is used for said determination, said spectral library data comprising an ensemble of material spectral characteristics corresponding to physical, construction, chemical and/or biological material properties;
    wherein determination of an object material or determination of a material state of an object data point is performed in correspondence with stored spectral characteristics associated with said material contained in said spectral library data by matching spectral characteristics detected by the imager with said stored characteristics in the spectral library data, wherein a stored spectral behavior in a given wavelength regime is compared with the detected spectral information in the corresponding wavelength regime; and
    wherein the determination for a specific material or specific material property is based upon a specific spectral distribution or pattern within a specific wavelength regime.

2. The device of claim 1 wherein the material properties include at least a degradation degree of said object.

3. The device of claim 1 wherein the material properties include at least a coverage degree, a contamination degree and/or a humidity degree of said object.

4. The device of claim 1 wherein the spectral library data comprises predetermined spectral information associated with a variety of spatial, temporal, atmospheric and illumination conditions and composition variations for a plurality of respective materials.

5. The device of claim 4 wherein one or more spectral characteristics associated with said objects are obtained and compared with predetermined spectral information, and wherein the material properties of said objects are determined based upon conformity between the obtained spectral characteristics and the predetermined spectral information.

6. The device of claim 1 wherein the object data points are mapped onto reference coordinates of a predetermined land registry chart and/or a web mapping services chart.

7. The device of claim 6 wherein the mapped object data points (Voxels) are utilized to generate three-dimensional models of the objects, and wherein the three-dimensional object models are scaled in respect to dimensions of the predetermined chart.

8. The device of claim 1 wherein the device is comprised by an autonomously and/or non-autonomously moving entity.

9. The device of claim 8 wherein the autonomously and/or non-autonomously moving entity is an airborne vehicle and/or a terrestrial based vehicle.

10. The device of claim 1 wherein the object data points are represented as a set of three-dimensional graphic information units (Voxels), wherein each three-dimensional graphic information unit indicates spectral, RGB and/or thermal data information associated with a respective spatial coordinate.

11. The device of claim 1 wherein the object data points are projected onto a plane, and wherein the identification of respective geometric elements of the object is based on an evaluation of a data point cluster density distribution in the plane.

12. The device of claim 11 wherein the identification can be realized by only considering densities above a predetermined density threshold.

13. The device of claim 11 wherein a variety of data point cluster density distribution profiles is obtained by rotating the projection surface by spatial angles.

14. The device of claim 11 wherein the device is configured to:

identify one or more object surfaces from the density distribution;

extrapolate an exterior contour of the object surface;

extract a characteristic line of the contour;

determine geometric 2-D properties of the characteristic line and extract all the lines with the same properties regardless of their density; and determine areas with geometrical properties in the same range as compared to the determined geometrical properties in order to construct a set of linearly dependent two-dimensional points.

15. The device of claim 11 wherein the evaluation of data point cluster density distribution is utilized to support the generation of interior and exterior fine structure and/or construction of the three-dimensional object models.

16. A method for analyzing objects including buildings, build environments and/or environment areas, the method comprising:

detecting image data points of said objects using an imager including:
an imaging spectrometer;
at least one of a laser scanner, an optical camera, or an infrared camera; and
at least one of an inertial measurement unit, an indoor positioning system (IPS) sensor, or a global positioning system (GPS) sensor;

assigning spatial coordinates to said respective image data points in order to obtain object data points; and determining at least material properties of said objects based on said object data points, wherein at least spectral library data stored in a database or in a memory associated with the device is used for said determination, said spectral library data comprising an ensemble of material spectral characteristics corresponding to physical, construction, chemical and/or biological material properties;

wherein determination of an object material or determination of a material state of an object data point is performed in correspondence with stored spectral characteristics associated with said material contained in said spectral library data by matching spectral characteristics detected by the imager with said stored spectral characteristics in the spectral library data, wherein a stored spectral behavior in a given wavelength regime is compared with the detected spectral information in the corresponding wavelength regime; and wherein the determination for a specific material or specific material property is based upon a specific spectral distribution or pattern within a specific wavelength regime.

17. The method of claim 16 wherein the object data points are mapped onto reference coordinates of a predetermined land registry chart and/or a web mapping services chart, and wherein the mapped object data points are utilized to generate three-dimensional models of the objects, and wherein the three-dimensional object models are scaled in respect to dimensions of the predetermined chart.

18. The device of claim 1 wherein:

said object data points are projected onto a projection surface plane in order to generate a data point cluster density distribution and a respective density profile in order to obtain object structures;

a surface normal of the projection surface plane is rotated by spatial angles in order to obtain a variety of data point cluster density distributions; and highly detailed three-dimensional object models are generated based on the object data points, indicating respective spatial positions of object elements as well as information concerning physical, chemical and/or biological material properties.

19. The method of claim 16 wherein:

said object data points are projected onto a projection surface plane in order to generate a data point cluster density distribution and a respective density profile in order to obtain object structures;

a surface normal of the projection surface plane is rotated by spatial angles in order to obtain a variety of data point cluster density distributions; and highly detailed three-dimensional object models are generated based on the object data points, indicating respective spatial positions of object elements as well as information concerning physical, chemical and/or biological material properties.

* * * * *